May 16, 1933.   J. BLAHO   1,908,813

BUTTER MEASURING DEVICE

Filed Jan. 4, 1932

INVENTOR
John Blaho
BY
ATTORNEY

Patented May 16, 1933

1,908,813

UNITED STATES PATENT OFFICE

JOHN BLAHO, OF ELMHURST, NEW YORK

BUTTER MEASURING DEVICE

Application filed January 4, 1932. Serial No. 584,752.

This invention relates to devices for extracting from a tub or other supply butter or any like substance of a similar consistency in a predetermined measured quantity.

It is now the practice among grocers and dairymen to remove the butter from the tub and by means of a specially designed cutting instrument, divide the frusto-conically shaped mass into a number of layers and without disturbing the mass, replace it into the tub. The butter is now retailed to individual buyers, in desired quantities, by digging into the exposed portion of the mass with a spatula of wood and removing by guess as much of the top layer as the vendor assumes is required. While grocers and dairymen acquire great skill in judging the correct amount that is wanted a greater or lesser quantity is often removed and weighing scales must be resorted to, to arrive at the exact amount.

It is therefore a major object of this invention to provide a device which will extract from a tub of butter or the like, substantially the required amount without first dividing the butter into layers as above mentioned.

Another object is to provide in such a device simple, selective means for predetermining the specified amount of butter to be extracted and which is of such accuracy that under ordinary circumstances, weighing would be unnecessary.

A further object is to provide an extracting device which is constructed in a circular form and employs a cutting wire, so a round disc of butter may be extracted. The cutting wire serves both to divide the disc into two equal halves and to sever the disc from the main mass.

Figure 1:
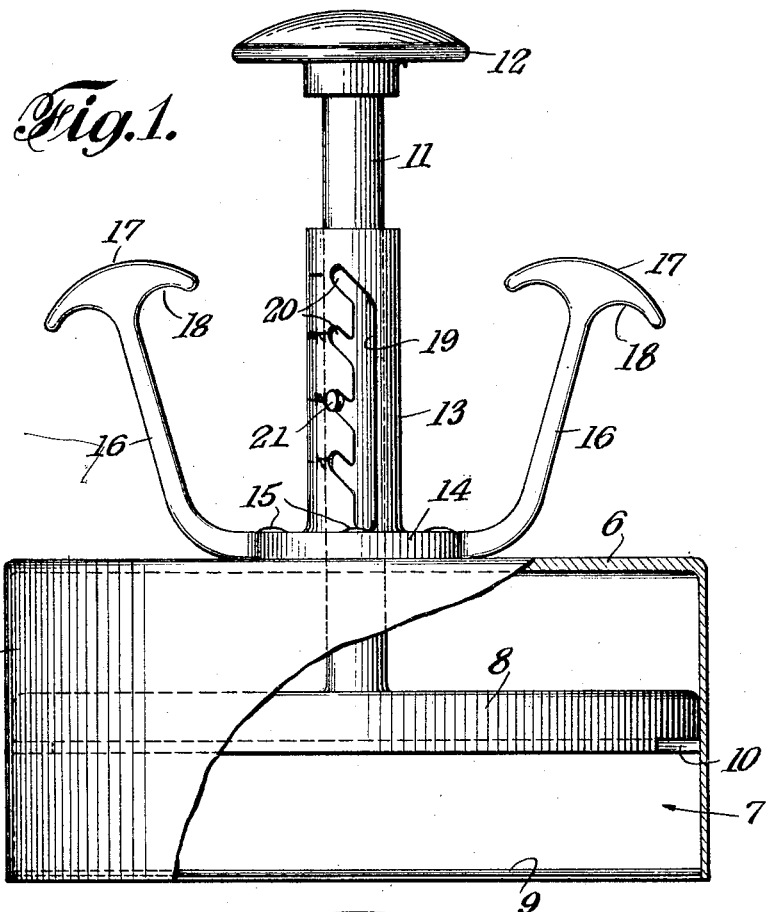
Figure 2:
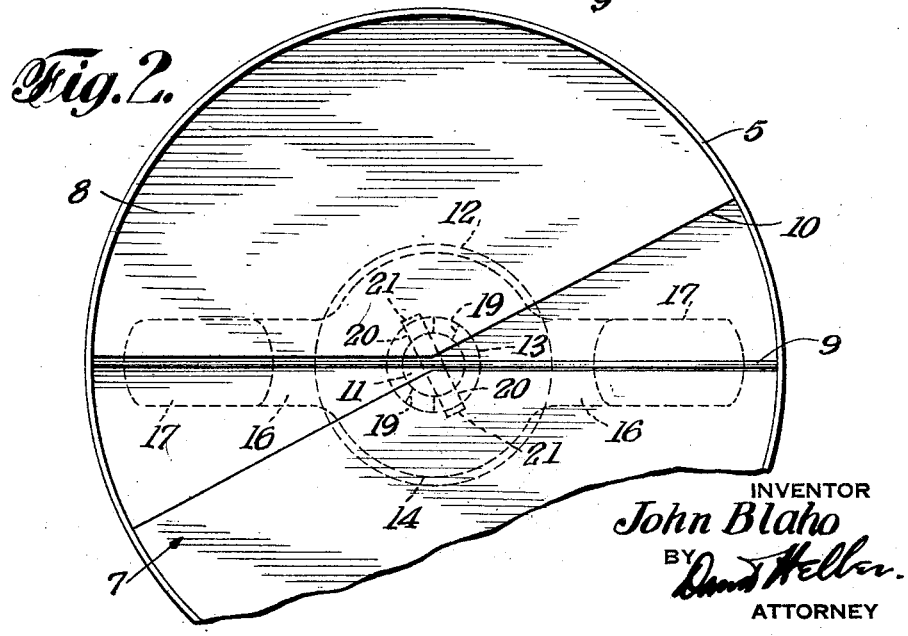

With other important objects, such as plunger means for removing the extracted butter from the device and simple means for pressing the device into the main butter mass, the invention consists in the simple construction and arrangement of parts as described in the following specification, defined by the appended claims and represented by the accompanying drawing, which is illustrative of a preferred embodiment of the invention and in which:

Fig. 1 depicts a side elevation of a device constructed in accordance with the invention with a portion in section for clearer illustration, and Fig. 2 is a bottom plan view thereof with a part broken away.

In greater detail there is shown at 5 a thin walled cylindrical casing having a closed end 6 and open at the other end to form a chamber 7 in which may move a plunger 8. Diametrically across the cylinder and adjacent the open end thereof may be provided a cutting wire 9 and at 10 is shown a recess in the face of the plunger.

The plunger 8 is provided with a stem 11 which projects through a central opening in the cylinder end 6 and is arranged with a removable pusher knob 12.

There is shown at 13 an upstanding hollow sleeve having a flanged portion 14 which is secured at 15 to the outer face of the cylinder end 6.

Integral with the sleeve 13 may be arranged arms 16, preferably two in number, and terminating in pusher portions 17 which may be hollowed on their under sides as at 18.

The sleeve 13 is preferably provided with opposed longitudinal slots 19 having communicating obliquely disposed branch notches 20 and stem 11 is provided with a pin 21 which serves to coact with the slots 19 and their branch notches 20.

In use, the vendor after ascertaining the amount of butter required by the buyer, adjusts the position of the plunger 8 by setting the protruding portions of the pins 21 in the corresponding notches 20 and in the drawing the device is shown as set to extract ½ pound of butter as indicated by the scale on the sleeve. Then grasping the pusher portions 17 of the arms 16, the open end of the cylinder 5 is pressed into the butter until the exposed face of the plunger comes to rest on the top of the main mass of butter. Still grasping the pusher portions 17, the cylinder 5 is rotated at least 180° and the wire 9 severs the bottom of the disc from the main mass of butter. The device is now extracted with the one-half pound disc of butter in the chamber 7 and the wire 9 now serves to prevent accidental dropping of the disc from the device. The disc is now ejected from the chamber by pushing on the knob 12 and pulling on the hollowed portions 18 of the arms 16. This squeezing action may be accomplished with either one hand or two as is commensurate with the consistency of the butter.

The initial push on the knob 12 partially rotates the plunger 8 as the pins 21 move out of the angularly disposed branch notches 20 into the longitudinal slots 19. This partial rotation of the plunger frees its bottom face from the butter disc and the recess 10 of the plunger prevents pressing against or mutilating the wire 9. As the disc is ejected the wire 9 divides it into two equal half discs which are easily separable and may be so sold.

While the foregoing is descriptive and illustrative of a preferred embodiment of the invention, it should be understood that many changes and modifications of construction may be made without departing from the full scope of the invention and the following claims:

1. In a device of the character described, an open ended cylindrical casing, a plunger operating in said casing, a sleeve fixed to the end wall of, and having a bore coaxial with the casing, a stem on the plunger and operable in the bore of the sleeve, said sleeve having opposed longitudinal slots with communicating oblique notches, pins on the stem settably engageable with the notches and longitudinally operable in the slots, a pusher knob on the stem and puller portions fixed to the casing, said notches and said pins cooperating, when pressure is exerted on the knob, to rotate the plunger relative to the casing simultaneously with its forward movement.

2. In a device of the character described an open ended cylindrical casing, a sleeve fixed to the end wall of the casing, a plunger operating in said casing, a stem on the plunger having a pusher knob and operating in said sleeve, associated means between the sleeve and the stem to adjustably position the plunger in the casing and at times to cause combined rotary and forward movement of the plunger, handle means to impress the casing into a soft easily divided substance, and also serving to rotate the casing, a cutting wire stretched across the mouth of the casing to sever from the main mass of substance the enclosed disc portion, and a recess in the outer face of the plunger to permit movement of the plunger slightly beyond the mouth of the casing.

Signed at New York, in the county and State of New York, this 30th day of December 1931.

JOHN BLAHO.